June 11, 1957 W. ESDALE 2,795,375

NON PRINT MECHANISM FOR INTERMEDIATE OPERATION OF MULTIPLYING AND DIVIDING MACHINES

Filed Oct. 12, 1953 2 Sheets-Sheet 1

INVENTOR.
WALTER ESDALE

BY George V. Eltgroth
Jh L Sterling
ATTORNEYS

INVENTOR.
WALTER ESDALE
BY George V. Eltgroth
Jh L Sterling
ATTORNEYS

United States Patent Office 2,795,375

Patented June 11, 1957

2,795,375

NONPRINT MECHANISM FOR INTERMEDIATE OPERATION OF MULTIPLYING AND DIVIDING MACHINES

Walter Esdale, South Norwalk, Conn., assignor, by mesne assignments, to Sperry Rand Corporation, New York, N. Y., a corporation of Delaware Application October 12, 1953, Serial No. 385,542

12 Claims. (Cl. 235—60.25)

This invention relates to new and useful improvements in calculating machines, and has particular reference to those calculators in which multiplication, division and similar operations are performed.

In previous calculating machines, multiplication and division take place as described more fully in a subsequently mentioned co-pending application. In multiplying, the multiplicand is set up in a traveling stop pin carriage by the successive depression of numeral keys; the carriage is further spaced to the left a number of spaces equal to the number of digits in the multiplier minus one; then a multiplying lever or button is operated to start the machine cycling for a number of cycles equal to the value of the first digit of the multiplier, at which time the lever is released and the opertion halts. Before the machine stops the muliplicand is printed on the tape together with the value of the multiplier digit employed. The lever is again operated and held until a number of cycles corresponding to the value of the second digit of the multiplier have taken place. When the lever is released the machine stops, but not before printing the second digit of the multiplier and the multiplicand in reduced denominational order, since, after each series of cycles, the carriage is backspaced one step. This action is repeated until the last multiplier digit has been used, whereupon the machine will cycle twice and print the product on the tape.

In division, the dividend is set up in the carriage and printed, after which the divisor is set up in the carriage and denominationally placed with its highest order digit under the highest digit in the dividend. The division key or button is then depressed, whereupon the machine cycles to divide by repeated subtraction. It goes through a plurality of series of cycles, and at the end of each series the divisor is printed in successively decreased denominational order on the tape, and the value of the quotient digit for each series is also printed. When the carriage has been back spaced through a series of cycles and, after a final cycle, the remainder in the accumulator is less than the divisor, the machine cycles to print the remainder, the value of the respective quotient digits having already been printed at the end of each cyclical series.

The main object of this invention is to eliminate all this excess printing. In multiplication, after the multiplicand is printed, no further printing thereof takes place until the product is printed at the end of the operation. In division, after the divisor is printed in the beginning, no further printing thereof is permitted and, at the end of the operation, only the remainder, if any, is printed.

A further object is to achieve this result with a minimum number of mechanical elements and with a minimum disturbance of the regular set up of the machine.

The invention in brief and general terms concerns a machine having a plurality of groups of printing hammers and includes means for blocking the printing action of one group of hammers; means for normally holding the blocking means in an inoperative position; cyclically operated means, which may comprise another group of hammers, to actuate the holding means to release the blocking means for movement to blocking position; and means operated by a pin box restoring means to restore the blocking means to normal inoperative position.

The invention more particularly includes a non-print bail which is related to the hammers for printing the multiplicand and the divisor, and which is normally held out of the path of said hammers when the hammers first advance to print the multiplicand or the divisor. The hammers which print the multiplier or the quotient are not influenced by said bail, but are related to the means for holding said bail in inoperative position, so that when these latter hammers are advanced, the holding means is actuated to release the bail, which is then allowed to move toward operative position in the path of the other hammers. As the pin carriage is successively backspaced it finally reaches normal position, at which time the mechanism for restoring the carriage to normal position operates a linkage to lift the non-print bail from its operative position to an inoperative position, at which time the holding means automatically moves into holding position to keep the bail elevated until the holding means is again actuated by the certain hammers as above set forth.

A present preferred form which the invention may assume is illustrated in the drawing, of which:

Figures 1, 2, 6, 7, 8, 9:
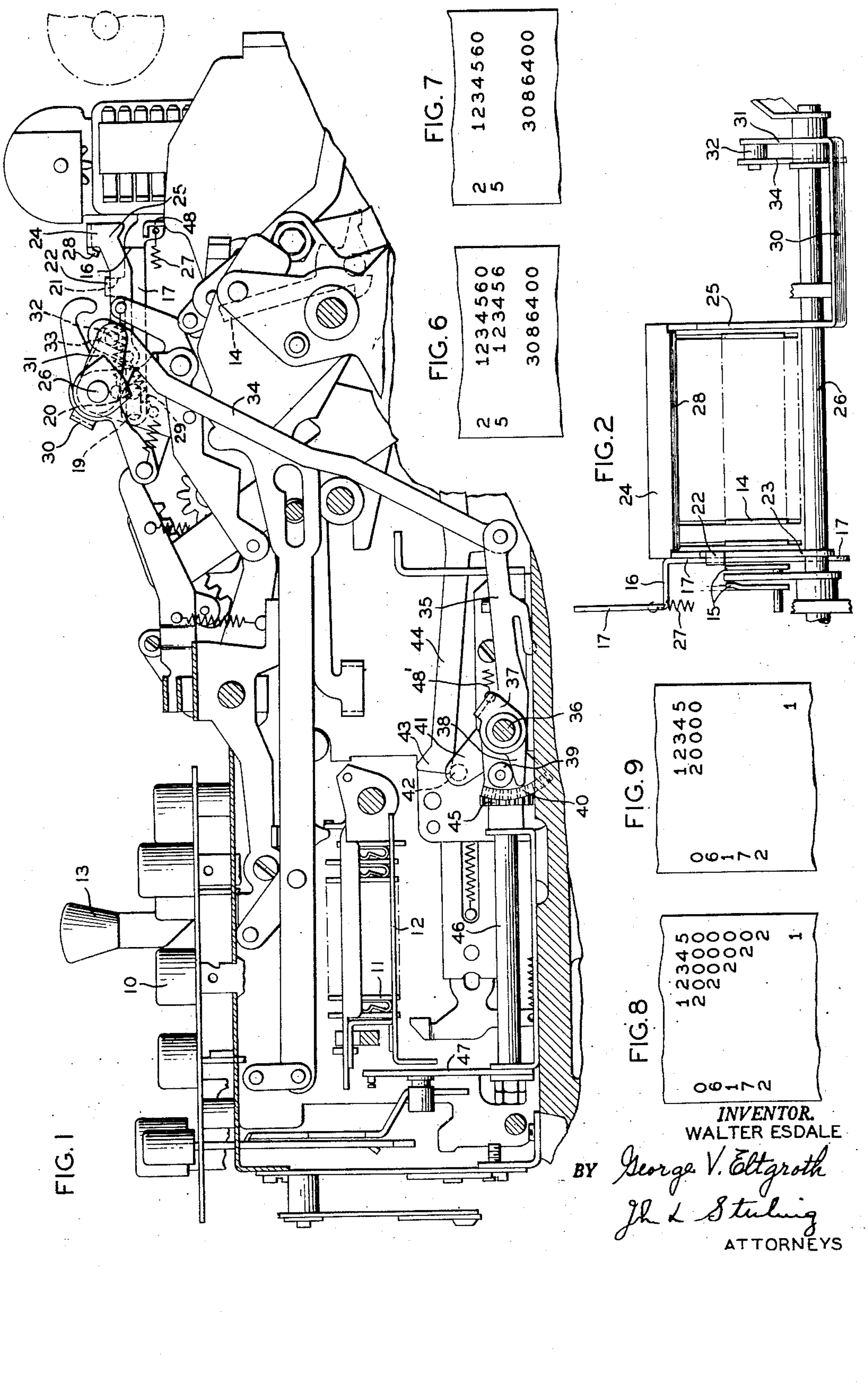
Fig. 1 is a partial side elevation of a calculating machine embodying the invention.
Fig. 2 is a partial plan view showing the non-print bail and its relation to the printing hammers.
Fig. 6 is a diagram of the material printed on the tape during a multiplying operation when the invention is not employed.
Fig. 7 is a similar view showing the material printed on the tape during a multiplying operation in which the invention is employed.
Fig. 8 is a similar view showing the material printed on the tape during a division operation when the invention is not employed.
Fig. 9 is a similar view showing the material printed on the tape during a division operation when the invention is employed.

Referring now merely to the specific form of the invention shown in the drawing, it is to be noted that this invention is an improvement of the mechanism shown in U. S. Patent 2,726,037, issued December 6, 1955, under the name of Walter W. Landsiedel and entitled "Short-Cut Multiplication Mechanism."

Before describing the details of the invention, the general previous operation, in part, of the above mechanism will be described, as follows:

The successive depression of numeral keys such as 10 will set up stop pins 11 in a stop pin carriage 12 which is stepped to the left after each key depression. In multiplication, after the multiplicand is thus set up, the carriage is spaced further to the left a number of spaces one less than the number of digits in the multiplier to be employed. The escapement mechanism is well known and not shown herein. With the carriage thus positioned a multiplying lever 13 is moved rearwardly and held for the number of cycles corresponding to the value of the first digit of the multiplier, at which time the lever 13 is released, and the multiplicand and the first multiplier digit are printed on the tape as shown in the top line of the printing in Fig. 6. This operation is repeated for each digit of the multiplier, after which the machine automatically cycles twice and prints the product at the bottom in red ink as shown in Fig. 6. It is to be noted that in this kind of operation the multiplicand is printed at the end of each series of cycles for each multiplier digit employed, for instance, as shown in the second line of Fig. 6.

In the operation of division, the dividend is set up by depressing the proper numeral keys 10. The motor bar (not shown) is then operated, and the dividend is printed on the tape as shown in the first line of Fig. 8. The carriage is restored to normal and the divisor is set up in the carriage and the highest order digit thereof is spaced over until it lies in the same order as the highest order digit of the dividend. The division key (not shown) is then actuated and the cycling begins to subtract from the dividend the divisor by repeated subtraction in the manner described in detail in the above application. At the end of the first cycle, however, the divisor is printed as shown on the second line of Fig. 8.

It will be noted from Figs. 6 and 8 that the multiplicand and the divisor are printed after each series of cycles, although in successively reduced denominational order. In order to eliminate this repeated printing of the multiplicand and the divisor, the herein invention was developed thereby to reduce the load on the machine and avoid unnecessary wear and tear on the mechanism.

Figures 3, 4, 5, 10, 11:
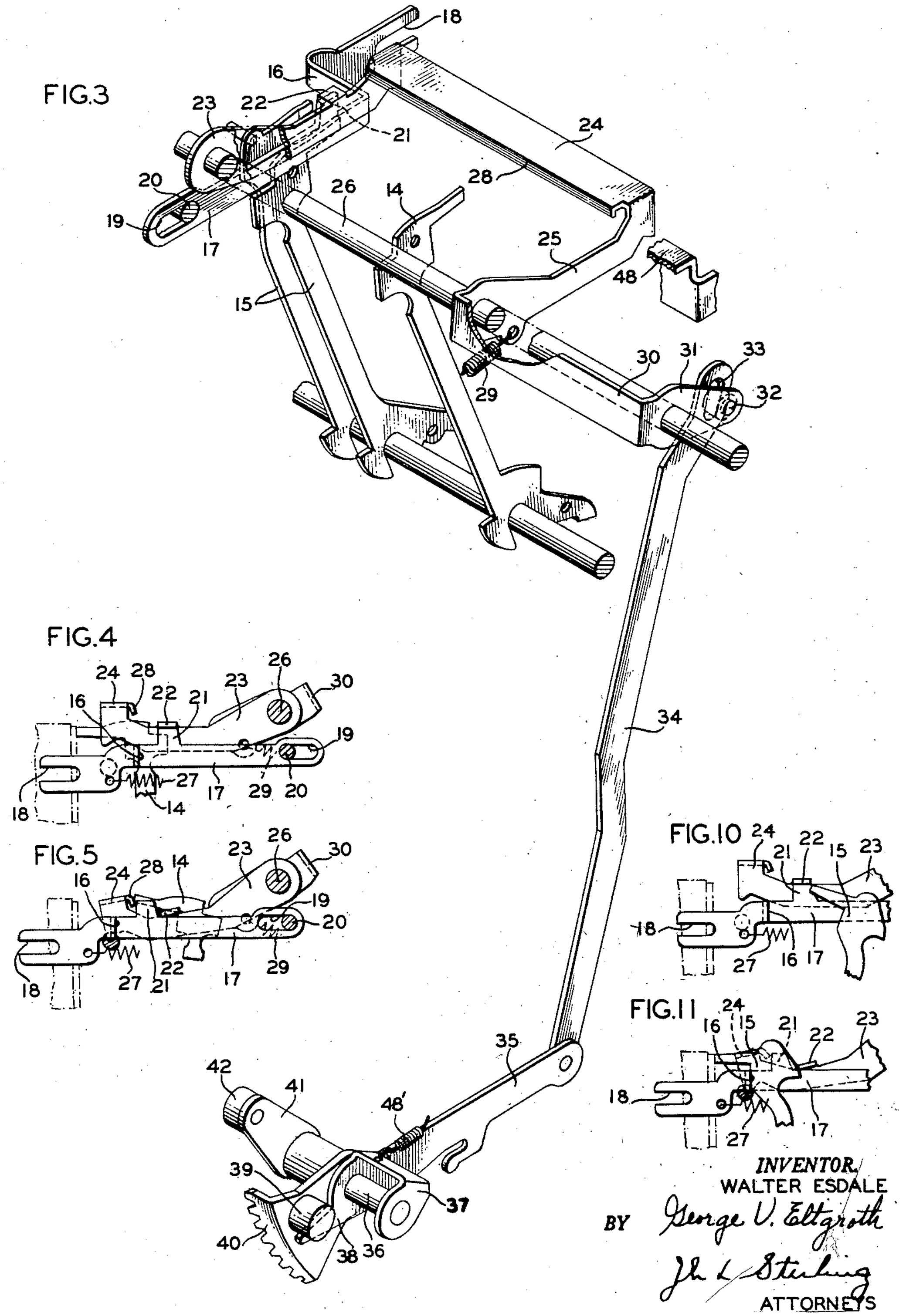
Fig. 3 is a perspective view of essential elements embodying the invention.
Fig. 4 is a detail view of the non-print bail in inoperative position.
Fig. 5 is a similar view of the bail in operative position.
Fig. 10 is a detail showing the position of the parts when the bail is up with the bail releasing hammer in normal position; and, Fig. 11 is a similar view showing the bail down and the bail releasing hammer in printing position.

According to the herein invention the printing of the multiplicand and the divisor are effected by means of a group of hammers such as 14 (Figs. 2 and 3) which are projected rearwardly at proper times in the cycles, as described in said application. Two other hammers 15 to the left of the other group and similarly operated are used to print the multiplier and quotient digits as shown in Figs. 6 to 9. At the first printing of the multiplicand and the divisor, as shown in the above mentioned figures, all the hammers above mentioned are rearward. As one of the hammers 15 are moved rearward from the position shown in Fig. 10 to the position shown in Fig. 11 to print the multiplier or the quotient digit, they encounter an offset portion 16 of a bail holding and releasing link 17 and move the link rearwardly. The link 17 at its rearward end is slotted at 18 to ride on a stud (not shown) fixed in the machine and at its front end is slotted at 19 to slide on a fixed stud 20 (Fig. 3). The link 17 is provided with an upstanding shoulder 21 which, in the normal position of the link as shown in Fig. 3, lies beneath an offset lip 22 extending from one arm 23 of a non-print bail plate 24, from one end of which the arm 23 extends forwardly as shown in Figs. 2 and 3. From the other end of the plate 24 extends a similar arm 25. The arms 23 and 25 are pivotally disposed on a shaft 26. A spring 27 is at one end attached to link 17 and at the other to a fixed point in the machine (not shown) for the purpose of restoring the link to normal position. The forward longitudinal edge of the bail plate 24 has a dependent edge 28. The bail plate 24 has a spring element 29 connected at one end to the arm 25 of the plate, and at the other end to a fixed point in the machine (not shown) for moving the bail plate downward to blocking position. The forward end of arm 25 is integral with an L-shaped link 30, one limb 31 of which is pivotally mounted on shaft 26. The end of limb 31 has a stud or roller 32 riding in a slot 33 in the upper end of a downwardly extending link 34. The lower end of link 34 is connected to the rear end of a lever 35 mounted pivotally on a shaft 36, and has at that point an integral offset L-shaped extension 37 also pivotally related to shaft 36 to stabilize the motion of link 35 around the shaft 36. The forward end of the lever 35 is formed as a toe 38, which normally lies directly beneath a stud or roller 39 disposed on the side of sector gear 40 movable with the shaft 36. The shaft 36 is provided with an arm 41 on the outer end of which is a roller 42 which is adapted to be engaged by the end 43 of a link 44 (Fig. 1). This link 44 is operated whenever the pin box 12 is to be restored to its normal position, as is described in the above application. In its operation it engages the roller 42, as it is moved forwardly during a cyclical operation, and turns the shaft 36 counterclockwise, as viewed in Figs. 1 and 3. This rotates the gear 40 which meshes with another sector gear 45 on a shaft 46 carrying an arm 47 connected to the pin box 12, in a manner described in said application. This movement of gear 40 also carries roller or stud 39 down to engage and depress the toe 38 which causes the elevation of lever 35 and link 34 to lift arm 31 and the bail plate 24. Thus the bail is lifted wehn the pin box is restored, so that the hammers 14 during the cycles following may print the result in the case of multiplication or the remainder, if any, in the case of division. A spring 48, is connected to a fixed point in the machine (not shown) and to the L-shaped extension 37 and tends to move the lever 35 to normal position. A stop plate 48 (Fig. 3) is suitably disposed in the machine below the bail plate 24 to limit its downward movement.

GENERAL OPERATION

*Multiplication*

With the parts in normal position, the lip 22 on bail arm 23 is resting on the shoulder 21 of the release link 17, thereby holding the bail plate 24 high enough so that all the print hammers 14 can pass beneath the downwardly turned edge 28 of the bail plate 24. The digit keys 10 are operated in the usual manner to enter the multi licand into the pin box 12 and the box moves to the left step by step until the entire number is entered. In the problem shown in Fig. 6, we are to multiply 123456 by 25 so we add an extra zero or space at the end of the multiplicand to allow for the number of digits, minus one, in the multiplier. Without the invention embodied therein the multiplier lever 13 is then moved rearward and held until the machine makes two cycles, at which time the lever is released. As this is done the print hammers 14 are operated to print the multiplicand and the print hammers 15 are operated to print the first digit of the multiplier. The lever 13 is then moved rearward again and held until the machine has cycled 5 times and is then released, at which time the machine prints the second multiplier digit 5 and the multiplicand reduced in value by one order. The machine then automatically proceeds to take a total and print the result at the bottom, as shown in Fig. 6, which result is 3086400.

With the invention embodied in the machine, as the hammers are operated to print the multiplicand and the first digit of the multiplier, one of the hammers 15 engages the offset portion 16 of the release link 17 and moves it rearward against the tension of spring 27. As this movement takes place, the shoulder 21 is moved rearwardly from under the lip 22, and the tension of spring 29 pulls the bail plate 24 down and the lip 22 lies in front of the shoulder 21 to hold the release link in the rearward position until the bail plate 24 is lifted again. The bail plate drops down on top of the hammers 14 in their rearward position, but as soon as the hammers are withdrawn from printing position the bail plate drops further down and lies in the position shown in Fig. 5, in which any further rearward movement of the hammers, while the bail plate is down, will cause the ends of the hammers to abut the down-turned edge 28 of the bail plate (Fig. 5) and prevent them from printing. Since the release link is blocked in rearward position there is nothing to lift the bail plate 24 until the pin box is restored as above mentioned, at which time the toe 38 is depressed to lift the lever 35 and link 34, as above stated, and lift the bail plate. When this happens the spring 27 immediately restores the link 17 and places the shoulder 21 under the lip 22. The spring 29 will hold the lip in this position until the link 17 is again released when another problem is being worked.

Figs. 10 and 11 show the print hammer 15 in normal and printing positions, respectively. In Fig. 10 the bail plate 24 is held up and the hammer is retracted in normal position, whereas in Fig. 11 the hammer has moved forward to printing position and has engaged the offset portion 16 to move the release link 17 and allow the plate 24 to drop to its lower position. The stud 32 and the slot 33 in link 34 are provided, so that after the link 34 has been lifted to elevate the bail plate 24, the link 34 may drop somewhat to restore the toe 38 to its normal position beneath the stud 39.

*Division*

With the parts in normal position as above stated, the digit keys 10 are operated to set up the dividend in the pin box in the usual manner. After this is done the motor bar (not shown) is operated to cycle the machine and print the dividend on the tape as shown in Fig. 8. Since neither the multiplier lever 13 nor the division key are operated when the motor bar is depressed, the hammers 15 do not move to actuate the release link and allow the bail plate 24 to drop.

Next the divisor is entered into the pin box, which has been restored to normal in the previous operation, and then stepped over until its highest order digit is under the highest order digit in the divisor. The division key is then operated and the machine commences to cycle to repeatedly subtract the divisor from the dividend, in the manner described in said application.

Without the invention embodied therein, the machine goes through a plurality of series of cycles, and at the end of each series the divisor is printed in successively reduced order due to the backspacing of the pin box after each series of cycles, as shown in Fig. 8. The quotient digits are also printed at the left of each divisor as shown.

With the invention embodied in the machine, the dividend is printed as above, and the first divisor is printed, after which no further printing of the divisor takes place. As shown in Figs. 8 and 9 the problem is to divide 12345 by 2. In Fig. 8 the successive printings of the divisors are shown whereas in Fig. 9 the printings thereof after the first one are eliminated. In this problem the quotient is 6172 with a remainder of 1. It should be clear then that after the first divisor is printed the rearward motion of the hammer 15 to print the first digit of the quotient has released the link 17 to allow the bail plate 24 to drop and lock the hammers from further action, in the manner described above with respect to multiplication. After the division cycles are ended the pin box is restored, and the bail plate 24 lifted as before to allow the remainder to be printed, if any, in the manner described in said application.

Briefly summarizing the invention it is seen that there are two groups of hammers for printing, the one group for printing the multiplicand and the dividend and divisor, and the other group for printing the multiplier and quotient digits. The first group is controlled by the bail plate 24, and the other group controls the release of the bail plate. The pin box restoring means controls the restoration of the bail plate to normal inoperative position.

The bail plate constitutes means for blocking the printing action of certain hammers; the other hammers and the release link 17 constitute means for holding the bail plate in inoperative position and for releasing it to blocking position; and the pin box restoring means constitutes means for restoring the bail plate to inoperative position.

While the invention herein has been fully shown and described in detail with respect to a present preferred form which the invention may assume, it is not to be limited to the specific form shown, since many changes and modifications may be made in the structure and parts without departing from the spirit and scope of the invention in its broadest aspects. Hence it is desired to cover any and all forms and modifications of the invention which may come within the spirit and scope of any one or more of the appended claims.

What I claim as new, and desire to secure by Letters Patent, is:

1. In a device of the class described having a plurality of groups of printing hammers and a pin box restoring means, means for blocking the printing action of one group of hammers, means for normally holding the blocking means in an inoperative position, means operated by another group of hammers to actuate the holding means to release the blocking means for movement to blocking position; and means operated when the pin box restoring means is actuated to restore the blocking means to normal inoperative position.

2. In a device of the class described having a plurality of groups of printing hammers and a pin box restoring means, means for blocking the printing action of one group of hammers, spring means normally tending to urge the blocking means to an inoperative position, means for normally holding the blocking means in an inoperative position, means operated by another group of hammers to actuate the holding means to release the blocking means for movement to blocking position, spring means tending to return the holding means to normal holding position, and means operated when the pin box restoring means is actuated to restore the blocking means to normal inoperative position.

3. In a device of the class described having a plurality of groups of printing hammers and a pin box restoring means, a bail plate for blocking the printing action of one group of hammers, a link for normally holding the bail plate in an inoperative position, a portion of said link lying in the path of another group of hammers to be actuated thereby when said other group moves to printing position, cooperating means on the bail plate and the link to release the bail plate when the link is thus actuated, spring means to move the bail plate, when thus released, to an operative position to block the first group of hammers, means operated when the pin box restoring means is actuated to restore the blocking means to normal inoperative position, and spring means to restore the link to holding position when the bail plate is restored to inoperative position.

4. In a device of the class described having a plurality of groups of printing hammers adapted to be moved simultaneously to printing position and a pin box restoring means, a bail plate adapted to lie in the path of one group of hammers to block the printing action thereof, a laterally extending lip on said bail plate, a link having an upright shoulder thereon to lie normally under said lip to hold the bail plate in an inoperative position, said link having an offset portion lying in the path of the other group of hammers to be actuated when said hammers are moved to printing position to remove the shoulder from beneath the lip, and spring means to move the bail plate down into the path of the first group of hammers when so released, the shoulder on the link lying to the rear of the lip whereby the link is held in rearward actuated position, means operated when the pin box restoring means is operated to restore the bail plate to inoperative position, and spring means to restore the link to holding position when the bail plate is thus restored.

5. In a device of the class described having a group of hammers adapted to be moved to printing position, a bail plate adapted to be moved into and out of the path of said hammers, a pin box restoring means, a linkage extending between the bail plate and the restoring means, and a pin and slot connection between said linkage and said bail plate whereby one can be moved somewhat independently of the other.

6. In a device of the class described having a group of hammers adapted to be moved to printing position, a bail plate adapted to be moved into and out of the path of said hammers, a pin box restoring means including a gear, a stud on the side of said gear, a linkage extending from the bail plate to a point adjacent said gear, and a toe on said linkage adapted to be engaged by the stud when the gear is actuated to operate said linkage and move the bail plate to an inoperative position.

7. In a device of the class described having a group of hammers adapted to be moved to printing position, a bail plate adapted to be moved into and out of the path of said hammers, a pin box restoring means including a gear, a stud on the side of said gear, a linkage extending from the bail plate to a point adjacent said gear, a toe on said linkage adapted to be engaged by the stud when the gear is actuated to operate said linkage and move the bail plate to an inoperative position, and a spring connected to the bail plate tending to move it to an operative position.

8. In a device of the class described having a group of hammers adapted to be moved to printing position, a bail plate adapted to be moved into and out of the path of said hammers, a pin box restoring means including a gear, a stud on the side of said gear, a linkage extending from the bail plate to a point adjacent said gear, a toe on said linkage adapted to be engaged by the stud when the gear is actuated to operate said linkage and move the bail plate to an inoperative position, and a pin and slot connection between said linkage and said bail plate whereby one can be moved somewhat independently of the other.

9. In a device of the class described having a group of hammers adapted to be moved to printing position, a bail plate adapted to be moved into and out of the path of said hammers, a pin box restoring means including a gear, a stud on the side of said gear, a linkage extending from the bail plate to a point adjacent said gear, a toe on said linkage adapted to be engaged by the stud when the gear is actuated to operate said linkage and move the bail plate to an inoperative position, a spring connected to the bail plate tending to move it to an operative position, and a pin and slot connection between said linkage and said bail plate whereby one can be moved somewhat independently of the other.

10. In a device of the class described having a group of hammers adapted to be moved to printing position, a bail plate adapted to be moved into and out of the path of said hammers, a pin box restoring means including a gear, a stud on the side of said gear, a linkage extending from the bail plate to a point adjacent said gear, a toe on said linkage adapted to be engaged by the stud when the gear is actuated to operate said linkage and move the bail plate to an inoperative position, a pin and slot connection between said linkage and said bail plate whereby one can be moved somewhat independently of the other, and a spring connected to the bail plate tending to move it to an operative position.

11. In a device of the class described having a plurality of groups of printing hammers and a pin box restoring means; means for blocking the printing action of one group of hammers; means for normally holding the blocking means in an inoperative position, and cyclically operated means associated with said holding means to actuate the holding means to release the blocking means for movement to blocking position immediately after the first printing action of the hammers to be blocked.

12. In a device of the class described having a plurality of groups of printing hammers and a pin box restoring means; means for blocking the printing action of one group of hammers, means for normally holding the blocking means in an inoperative position, cyclically operated means associated with said holding means to actuate the holding means to release the blocking means for movement to blocking position immediately after the first printing action of the hammers to be blocked, and means associated with the blocking means and operated when the pin box restoring means is actuated to restore the blocking means to normal inoperative position.

References Cited in the file of this patent

UNITED STATES PATENTS

| | | |
|---|---|---|
| 898,282 | Streb | Sept. 8, 1908 |
| 2,424,359 | Liljestrom et al. | July 22, 1947 |
| 2,682,994 | Boyden et al. | July 6, 1954 |